UNITED STATES PATENT OFFICE.

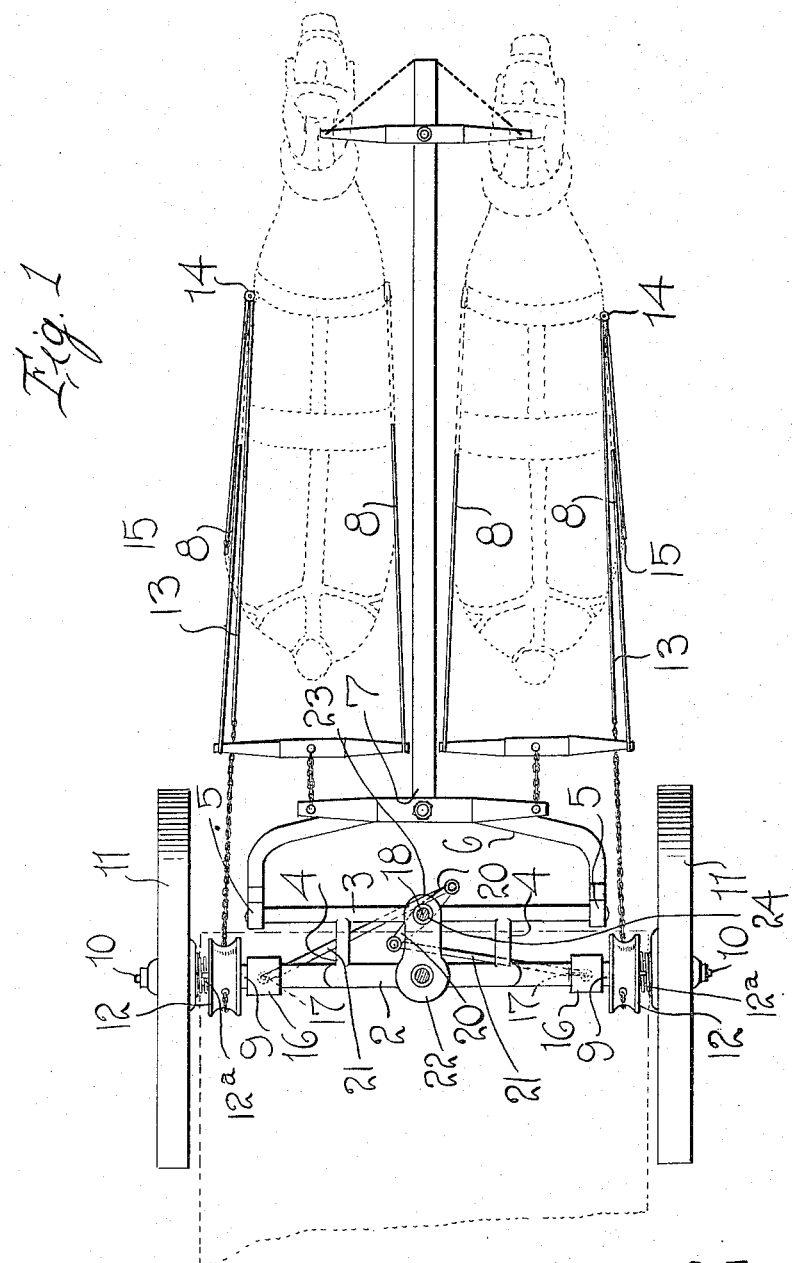

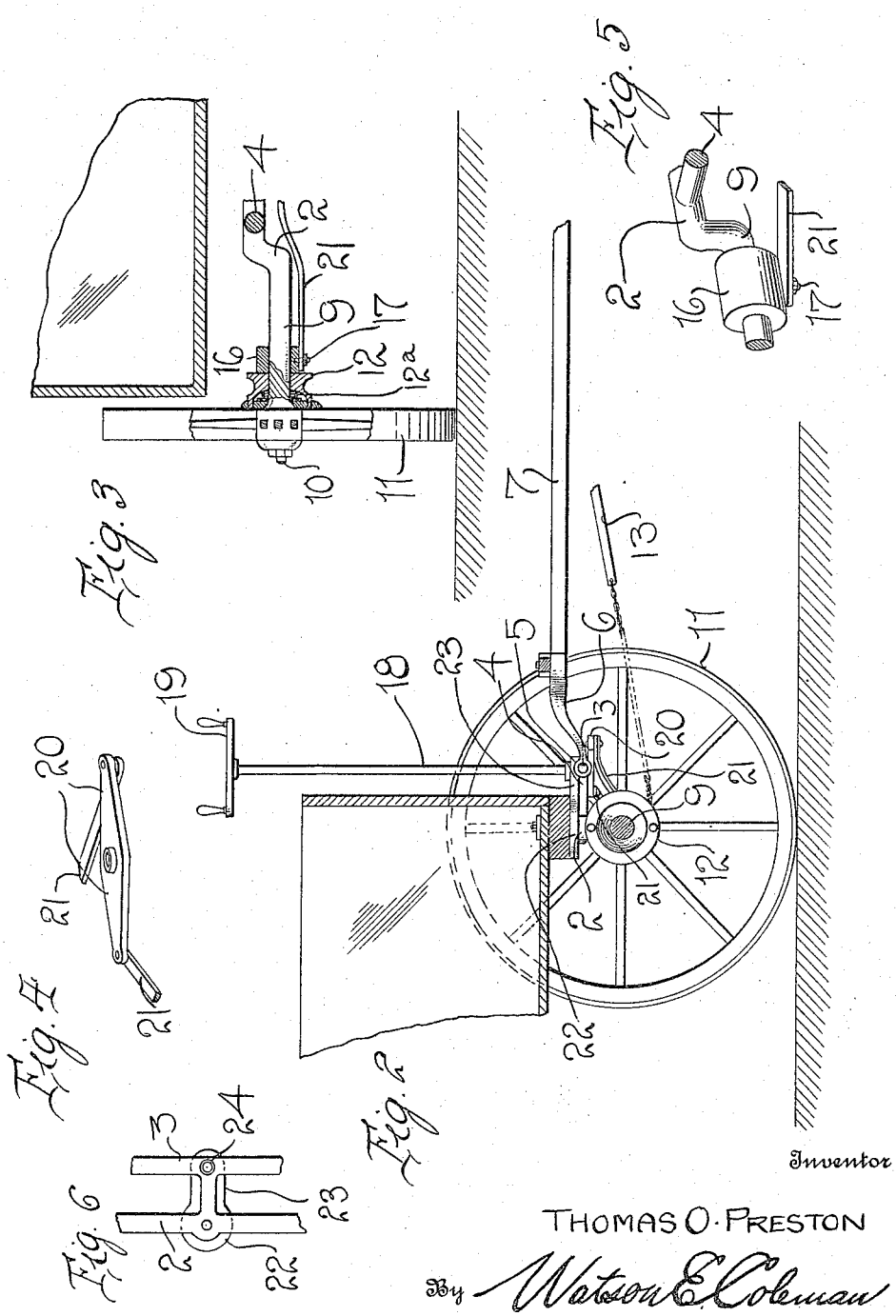

THOMAS O. PRESTON, OF STAUNTON, VIRGINIA.

DEVICE FOR STOPPING RUNAWAY HORSES.

1,160,318.  Specification of Letters Patent.  Patented Nov. 16, 1915.

Application filed March 27, 1915. Serial No. 17,455.

*To all whom it may concern:*

Be it known that I, THOMAS O. PRESTON, a citizen of the United States, residing at Staunton, in the county of Augusta and State of Virginia, have invented certain new and useful Improvements in Devices for Stopping Runaway Horses, of which the following is a specification, reference being had to the accompanying drawings.

My invention relates to vehicles, and particularly to means adapted to be mounted on and used in connection with a vehicle whereby the draft animals of the vehicle may be stopped if running away.

It has heretofore been proposed to provide means for releasing a runaway horse or horses from a vehicle, but while this method conserves the safety of the occupants of the vehicle it permits the frightened animal to continue on its way, with a chance of overturning and injuring pedestrians and doing a great deal of damage.

The primary object of my invention is the provision of means whereby, instead of releasing the animal, the vehicle and the animal are relatively drawn toward each other to impede the progress of the animal and eventually stop it, or throw it, if necessary.

A further object of my invention is to provide means whereby the power of the supporting wheels of the vehicle may be used to relatively draw the horse and the vehicle toward each other in case of a runaway.

Still another object of my invention is to provide a construction wherein halting traces are provided which extend from suitable winding drums or pulleys mounted in conjunction with the front axle of the vehicle, and to provide means whereby these winding drums or pulleys may be manually shifted into operative engagement with the front vehicle wheels so as to cause the power from these wheels to turn the drums, thus winding up on the halting traces so as to check it or throw the animal.

A further object of my invention is to provide a mechanism of this character which is equally applicable to use with either a single or double rig, and which is further adapted to be used with any style of vehicle and readily applied thereto without any but a very slight change.

Other objects will appear in the course of the following description.

My invention is illustrated in the accompanying drawings, wherein:

Figure 1 is a plan view of the forward portion of a wagon showing my stopping device applied thereto; Fig. 2 is a side elevation, partly in section, of the forward portion of the wagon; Fig. 3 is a fragmentary sectional view of the forward axle, showing in section one of the winding drums mounted thereon and its actuating collar; Fig. 4 is a perspective detailed view of the means for actuating the block 16; Fig. 5 is a perspective detailed view of a portion of the front axle and a block 16; Fig. 6 is an underside plan view of the supporting frame and fifth wheel.

Referring to these figures, it will be seen that my device includes a transversely extending axle 2, and the parallel yoke-engaging bar 3, which is connected to the axle 2 by means of rearwardly extending braces 4. Preferably the axle 2, braces 4, and bar 3 are made integral, though this is not necessarily the case. The ends of the bar 3 are adapted for engagement with the yoke of a tongue or pole as in Fig. 1. In case a single draft animal is hitched to the vehicle, the thill couplings of the shaft may, of course, be attached to the ends of the bar.

In the form of my invention illustrated in the accompanying drawings, the ends of the bar 3 are reduced to engage with couplings 5 which are in turn engaged with a yoke 6, to which a pole 7 is connected in any usual or ordinary manner. The usual whiffle-tree or double tree is adapted to be connected to the pole and yoke in the usual or ordinary manner, and the draft animals are connected to the whiffle-trees by means of the usual traces 8.

As shown most clearly in Fig. 2, the axle 2, at the middle of its length, is disposed in approximately the same plane as the bar 3, but on each side of the braces 4 the axle 2 is downwardly depressed as at 9, and then extends laterally outward and is reduced to form the skeins 10, to which the front wheels 11 are attached in the usual manner, the front wheels revolving upon the axle.

Mounted upon the depressed ends 9 of the axle are the rotatable and slidable pulleys or drums 12. The outer ends of these drums are so formed that they will have rotative engagement with the hubs of the wheels when these drums are forced laterally outward, and this engagement may be secured either by frictional contact between the drums and the hubs of the supporting wheels or by having the contacting faces of the drums and wheels formed respectively with teeth and recesses. A spring 12ª urges the drum out of engagement with the wheel, the spring bearing against a washer on the axle. Wound upon these drums or pulleys 12 are the forwardly extending halting traces 13. These traces extend forward and are operatively connected in any suitable manner to the draft animal or animals. As illustrated, the traces 13, which may be formed each of a leather strap or of a length of chain and a length of leather strap, or in any other suitable manner, pass over pulleys 14 attached to the neck strap of the harness and then extend rearward in a connecting breeching, as at 15.

For the purpose of throwing the pulleys or winding drums 12 into engagement with the hubs of the front vehicle wheels, I mount upon the axle ends 9 sliding blocks 16, each of these blocks being formed with a depending pin 17, and mounted rotatably in the bar 3 is the upwardly extending shaft 18 whose upper end is provided with a double handle 19 whereby the shaft may be operated, while its lower end is provided with the oppositely disposed radially extending cranks 20. Each of these cranks is connected to a corresponding sliding block 16 by means of a link 21. When the shaft 18 is turned to the position shown in Fig. 1, the sliding blocks and also the pulleys 16 are shifted inward away from the hubs of the wheels. When, however, it is desired to force the pulleys or drums into rotative engagement with the wheels, the shaft 18 is rotated to throw the sliding blocks outward, thereby forcing the pulleys or drums into engagement with the wheels.

Preferably the upper face of the axle is formed with a fifth wheel, designated 22, upon which the forward bolster of the vehicle is adapted to rest and rotate in the usual manner, and preferably this fifth wheel is extended forward, as at 23, and extends over the bar 3. The fifth wheel and its extension 23 may be formed integral with the axle and bar 3, and preferably are so formed. This extension 23 is formed with a central opening 24 through which the shaft 18 passes and by which it is supported, the oppositely disposed cranks 20 being disposed beneath the under face of this extension, as illustrated clearly in Fig. 2.

The operation of my invention will be obvious from the above description. Under normal circumstances, the halting traces are relatively loose and power is applied to the vehicle through the ordinary traces. Now if the draft animals run away and there is danger of an accident, the operator has only to rotate the shaft 18. This will act to throw the links laterally, shifting the sliding blocks 16 laterally and carrying the pulleys or drums into engagement with the hubs of the vehicle wheels. Inasmuch as these halting traces extend below the drums, it is obvious that a rotation of the front wheels in the direction in which the vehicle is going will act to wind the halting traces up upon the drums or pulleys. This will cause the horses to be drawn rearward in the sense at least that the halting traces will be so tightened by this action as to seriously impede the free movement of the draft animal and cause its stoppage. At the same time the force required to wind up the halting traces will act to impede the rotation of the front wheels, and these wheels will skid to some degree, thus acting as a brake. Under these circumstances the horse is very easily checked, and if the rearward pull upon the horse is severe enough the horse or horses will be thrown.

It will also be obvious that this invention may be applied to a one-horse hitch as well as to a two-horse hitch, the only difference being that with a one-horse hitch there will be two halting traces, one disposed at each side of the horse, whereas where two horses are used, as in the drawings, there will be one halting trace for each horse. The action, however, will be the same in either case.

While I have illustrated certain detailed features of my invention which I believe to be of particular efficiency, I do not wish to be limited to this construction as it is obvious that many changes may be made in the detailed construction without departing from the spirit of the invention.

Having thus described my invention, what I claim is:

1. The combination with a vehicle including an axle having its terminal portions extended downwardly and at right angles to the body portion and then outwardly at right angles to the downwardly extended portion, supporting wheels mounted upon the outwardly extended portions, rotatable drums slidably mounted upon the outwardly extended portions, and movable into rotative engagement with the supporting wheels, springs normally urging said drums out of engagement with the wheels, sliding members mounted upon the outwardly extending portions of the axle, and manually operable means for shifting said sliding members laterally to carry the winding drums into engagement with the wheel, said sliding members being limited in their longitudinal movement, upon the axle by engagement with the downwardly extended portions thereof.

2. The combination with a vehicle including a bolster, of an axle, supporting wheels thereon, a fifth wheel formed integral with the axle and upon which the bolster is supported, said fifth wheel having a forward extension, a draft bar extending parallel to the axle and formed integral with said forward extension of the fifth wheel and being connected to the axle at a plurality of points, the extremities of said draft bar being adapted to be engaged by draft devices, halting traces, winding drums slidably mounted on the axle and with which said halting traces are engaged, said winding drums being movable into rotative engagement with the supporting wheels, springs urging the winding drums out of engagement with the wheels, and manually operable means carried by said forward extension of the fifth wheel for positively shifting the winding drums into rotative engagement with the wheels.

In testimony whereof I hereunto affix my signature in the presence of two witnesses.

THOMAS O. PRESTON.

Witnesses:
 Mrs. STUART SCOTT,
 MARY M. BRANNER.

Copies of this patent may be obtained for five cents each, by addressing the "Commissioner of Patents, Washington, D. C."